D. E. GARRETT.
LOCK NUT.
APPLICATION FILED AUG. 28, 1912.

1,067,649.

Patented July 15, 1913.

Witnesses
P. M. Hunt.
E. L. Mueller.

Inventor,
Dwight E. Garrett.

By Victor J. Evans.
Attorney

UNITED STATES PATENT OFFICE.

DWIGHT E. GARRETT, OF DELTA, IOWA.

LOCK-NUT.

1,067,649.

Specification of Letters Patent.   Patented July 15, 1913.

Application filed August 28, 1912. Serial No. 717,546.

*To all whom it may concern:*

Be it known that I, DWIGHT E. GARRETT, a citizen of the United States, residing at Delta, in the county of Keokuk and State of Iowa, have invented new and useful Improvements in Lock-Nuts, of which the following is a specification.

The general object of this invention is the provision of a lock nut which is so constructed as to effectually prevent turning of the nut in either direction upon the bolt; and to this end the invention consists in certain novel constructions, arrangements, and combinations of devices which will be fully described hereinafter and then pointed out in the appended claim.

In carrying out the object of the invention generally stated above, it will be understood, of course, that the essential features thereof are susceptible to changes in details and structural arrangements, one preferred and practical embodiment being shown in the accompanying drawing, wherein:—

Figure 1:
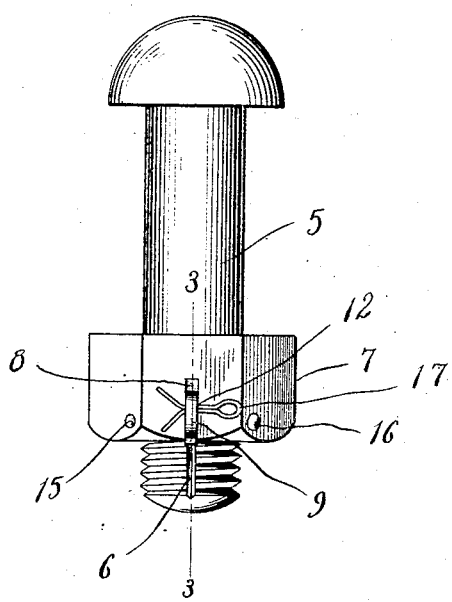
Figure 3:
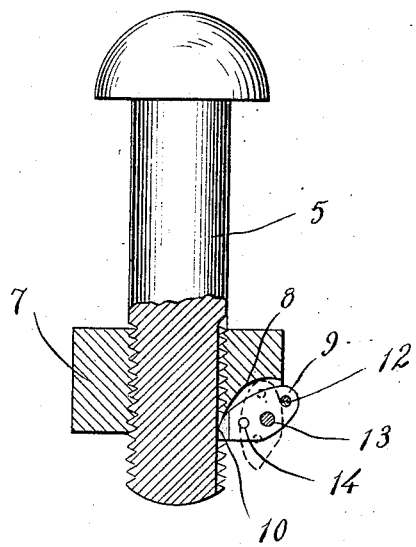
Figure 2:
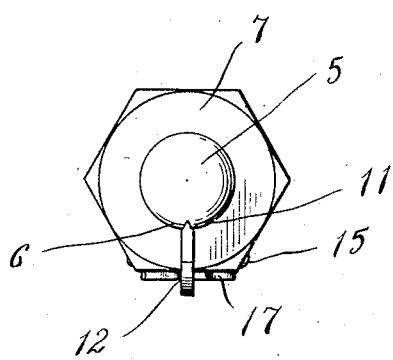
Figure 4:
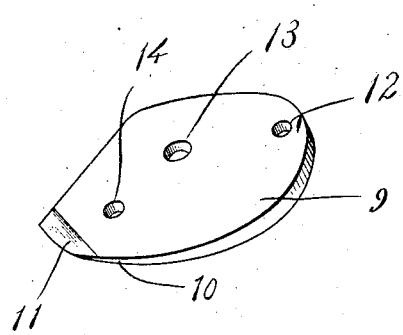

Figure 1 is a side elevation of the nut lock constructed in accordance with the invention. Fig. 2 is a top plan view thereof. Fig. 3 is a vertical sectional view taken on the line 3—3 of Fig. 1. Fig. 4 is a detail perspective view of the locking plate used in connection with the invention.

Referring more particularly to the accompanying drawing in which like reference characters designate similar parts, 5 indicates a threaded bolt of any ordinary well known construction and having a longitudinally extending groove 6 for a portion of its length. A nut 7 also of any well known construction is adapted to be threaded upon the bolt 5 and is provided with a transverse passage 8 in one side thereof which is adapted to register with the groove 6. In order to prevent the turning of the nut upon the bolt, a locking plate 9 is provided, said plate having an arcuate edge 10 which is adapted to engage the inclined bottom of the passage 8 whereby said plate may be caused to ride into engagement with the groove 6 when the same is moved inwardly. The arcuate edge 10 is beveled as indicated at 11 to provide a knife edge which is adapted to bite into the bolt whereby the same will be securely gripped. In order to retain the plate in locking position, the same is provided with the openings 12, 13, and 14, the opening 13 being adapted to receive a locking pin 15 which extends transversely through an opening 16 formed in the nut 7. It will be seen that the locking plate 9 is now merely pivoted in the passage 8 and is adapted to be swung into and out of engagement with the bolt 5 by reason of the arcuate edge 10. When the locking plate is swung out of engagement with the bolt, the opening 14 in said plate will be exposed beyond the outer face of the nut 7 and should it be desired to retain said plate in this position, a cotter pin 17 may be inserted into said opening, whereby movement of said plate will be prevented. When it is desired to prevent rotation of the nut upon the bolt, the cotter pin 17 may be removed from the opening 14 and the plate 9 swung into engagement with the bolt 5 so that the beveled knife edge 11 thereof will engage the groove when in this position, the opening 12 in the plate 9 will be exposed beyond the side of the nut 7 so that the cotter pin 17 may be inserted thereinto thus securely retaining the plate 9 in a locking position.

From the foregoing description taken in connection with the accompanying drawing, it will be seen that the invention contemplates providing a nut lock which is simple in construction thus reducing the cost of manufacture of the same to a minimum and which is durable and effective in carrying out the purpose for which it is designed.

What is claimed is:—

In a nut lock, the combination with a bolt having a longitudinal groove therein, of a nut threaded upon said bolt and having a passage adapted to register with said groove, a locking plate pivoted in said passage and having a knife edge adapted to engage said groove, means extending transversely of said nut for pivotally mounting said plate in said passage, said plate being formed with openings arranged respectively to aline with the outer surfaces of the nut when the plate is in operative or inoperative position, and means coöperating with either of said openings to bear against the adjacent surface of the nut to limit the movement of the plate in one direction.

In testimony whereof I affix my signature in presence of two witnesses.

DWIGHT E. GARRETT.

Witnesses:
G. A. BERNARD,
J. C. REED.